US008020508B2

(12) United States Patent
Altan et al.

(10) Patent No.: US 8,020,508 B2
(45) Date of Patent: Sep. 20, 2011

(54) METHODS AND APPARATUS FOR DEPOSITING NANOPARTICLES ON A SUBSTRATE

(75) Inventors: M. Cengiz Altan, Norman, OK (US); Levent Aktas, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 562 days.

(21) Appl. No.: 11/901,566

(22) Filed: Sep. 18, 2007

(65) Prior Publication Data

US 2008/0187657 A1    Aug. 7, 2008

Related U.S. Application Data

(60) Provisional application No. 60/845,747, filed on Sep. 19, 2006.

(51) Int. Cl.
*B05D 1/12* (2006.01)
(52) U.S. Cl. ........ 118/308; 118/612; 427/180; 427/185; 977/773; 977/841; 977/858
(58) Field of Classification Search ................. 118/612, 118/308; 427/180, 185, 181, 182, 196, 195; 977/840, 841, 858, 859, 890
See application file for complete search history.

(56) References Cited

U.S. PATENT DOCUMENTS

| | | | |
|---|---|---|---|
| 3,004,861 A * | 10/1961 | Davis | ............................ 427/182 |
| 5,628,090 A * | 5/1997 | Lock | ............................... 19/304 |
| 6,465,052 B1 | 10/2002 | Wu | |

(Continued)

FOREIGN PATENT DOCUMENTS

KR    2006089387 A  *  8/2006

(Continued)

OTHER PUBLICATIONS

Abot, J.L., et al., "Mechanical and Thermoviscoelastic Behavior of Clay/Epoxy Nanocomposites", *Mat. Res. Soc. Symp. Proc.*, vol. 740 (2003) pp. 162-177 (I6.5.1-I6.5.6).

(Continued)

*Primary Examiner* — Dah-Wei D Yuan
*Assistant Examiner* — Charles J Capozzi
(74) *Attorney, Agent, or Firm* — Dunlap Codding, P.C.

(57) ABSTRACT

The present invention is a process for uniformly depositing nanomaterials having particles smaller than 1 μm (i.e., nanoparticles) onto a surface of a base material (substrate or surface). The process is used to deposit any solid (nanoparticle) of any shape such as nanofibers, nanotubes, nanoclays (e.g., platelet shaped), nano-spheres, or irregularly shaped granules. The base material upon which the nano-particles are deposited can be made of any material. The method substantially prevents the deposition on the base material of larger particles (contaminants or clusters of the nanoparticles) which are often mixed with the nanomaterials. The amount of deposition and the range of particle sizes to be deposited can also be controlled by this method. Maintaining deposition uniformity, controlling the amount of deposition, and the elimination of larger particles enhances the utility of nanomaterials, and by subsequent processing, enables the development of multifunctional composite materials (or other coated substrates) to be used in commercial applications. In the present invention nanoparticles are applied to other base materials by substantially eliminating deposition of larger clusters or aggregates of nano-sized materials or other large impurities of other materials upon or in the base materials by positioning the base material within an upper portion of a deposition chamber.

7 Claims, 10 Drawing Sheets

U.S. PATENT DOCUMENTS

| | | | |
|---|---|---|---|
| 2003/0108459 A1 | 6/2003 | Wu et al. | |
| 2003/0228415 A1* | 12/2003 | Bi et al. | 427/180 |
| 2004/0026030 A1* | 2/2004 | Hatono et al. | 156/279 |
| 2005/0280681 A1* | 12/2005 | Kim et al. | 347/102 |
| 2006/0051505 A1 | 3/2006 | Kortshagen et al. | |
| 2006/0051522 A1 | 3/2006 | Talton | |
| 2006/0160367 A1* | 7/2006 | Wai et al. | 438/745 |

FOREIGN PATENT DOCUMENTS

WO PCT/US2007/020266  9/2008

OTHER PUBLICATIONS

Aktas, L., et al., "Quantitative Analyses of Nanoclay Dispersion in Molded Epoxy Disks: Effects of Mixing Temperature", *Nanomaterials: New Research*, ISBN: 1-59454-369-0, (2005) Nova Science Publishers, Inc., pp. 197-218.

Chen, L., et al., "Fracture Properties of Nanoclay-Filled Polypropylene", *Journal of Applied Polymer Science*, (2003) Wiley Periodicals, Inc., vol. 88, pp. 3298-3305.

Lam, C.-K, et al., "Cluster size effect in hardness of nanoclay/epoxy composites", *Composites Part B: 36*, (2005) pp. 263-269.

Lam, C.-K, et al., "Effect of ultrasound sonication in nanoclay clusters of nanoclay/epoxy composites", *Materials Letters*, 59 (2005) pp. 1369-1372.

Yasmin, A., et al., "Processing of Clay/Epoxy Nanocomposites with a Three-Roll Mill Machine", *Mat. Res. Soc. Symp. Proc.*, vol. 740 (2003) Materials Research Society, pp. 75-80 (I3.7.1-I3.7.6).

\* cited by examiner

METHODS AND APPARATUS FOR DEPOSITING NANOPARTICLES ON A SUBSTRATE

CROSS-REFERENCE TO RELATED APPLICATIONS

The present application claims the benefit under 35 U.S.C. 119(e) of U.S. Provisional Application Ser. No. 60/845,747, filed Sep. 19, 2006, the entirety of which is hereby expressly incorporated herein by reference.

STATEMENT REGARDING FEDERALLY SPONSORED RESEARCH OR DEVELOPMENT

Not applicable.

BACKGROUND

Dispersal of nanoparticles into or onto other media has been one of the major research thrusts during the last 5 to 10 years in the materials research community. Enhancing physical and mechanical properties of composite materials that contain nanoparticles depends on our ability to fully disperse them at small length scales. Conventional polymeric composites contain fibers or additives with length scales in the order of 5-50 μm. For example, higher performance polymeric composites contain 6-8 μm-diameter graphite fibers, whereas lower performance and cheaper composites contain 12-15 μm-diameter glass fibers. Fibers made of other materials are used less often in polymeric composites.

Nanoparticles are expected to enhance the properties of conventional composites if larger particulates and clusters are filtered out. Larger macro-particles or clusters are detrimental to the properties of the composite materials since, they: (i) tend to have various types of defects at the atomic or molecular level, (ii) may contain voids or impurities, (iii) facilitate ineffective load transfer at the interface due to their larger size, and (iv) are prone to initiating failure due to their usually irregular shape. For such cases, mixing nanomaterials into other materials, whether they are polymeric or metallic, may degrade some of the original material properties.

Methods of mixing and dispersing nanomaterials into other materials are currently being studied in the field. Various proposed methods include (i) directly mixing nanomaterials with a polymer either in the solid or liquid form by a mechanical mixer, (ii) using a sonicator or ultrasonic energy to enhance dispersion, (iii) using an electric field after mechanical mixing to enhance dispersion (applying AC or DC voltage at various levels has been tried), (iv) solid state mixing such as grinding nanomaterial and polymer together at room temperature, (v) mixing with a polymer during melting in an extruder before the extrusion or molding process (this method benefits from the high shear forces generated in an extruder to enhance dispersion), (vi) cryo-mixing or mixing at very low temperatures to make the polymer brittle enough so that polymer particles can be mixed with nanomaterials at a smaller length scale, and (vii) heating the polymer to higher temperatures to decrease the viscosity of the polymer to enhance the mixing.

The methods mentioned above are processing-based efforts to achieve uniform and nanoscale dispersion/mixing so that functional nanocomposites can be manufactured. There have been dozens, possibly hundreds, of articles published during the last five years studying various aspects of these methods.

The utilization of nanometer scale particulates such as carbon nanotubes and nanoclay with polymers is increasing due to the potential improvements in thermo-physical properties even with minor amounts. Among these nanometer scale particulates, nanoclay is widely used due to its low cost and availability. The utility of nanoclay with thermoplastics is demonstrated with various studies and commercial applications. For instance, researchers at The Toyota Research Labs observed up to 60% increase in strength of nylon 6 samples with the addition of nanoclay. Similarly, Chen et al.[1], fabricated nanocomposite samples by melt-compounding nanoclay with maleic anhydride modified polypropylene at loadings up to 50%. The authors observed monotonic improvements in tensile strength and stiffness, reaching 120% and 400%, respectively. In addition to the academic research, several applications utilizing nanoclay such as in side moldings in automobiles have been commercialized.

Contrary to its utilization with neat thermoplastics, potentials of nanoclay could not previously be fully realized in thermosetting resins or thermosetting composites. The reported results in literature are often inconsistent, or indicate degradation of properties such as tensile strength by the nanoclay addition. For instance Abot et al.[2] used two commercially available nanoclays, Cloisite® 30B and Nanomer® I.28E to reinforce DGEBA type epoxy resin. The mechanical properties and glass transition temperature of the fabricated samples were characterized. The tensile stiffness was observed to increase by 31% while the strength deteriorated by 28%. In addition to reduction in tensile strength, the authors observed 28% reduction in glass transition temperature. Although x-ray diffraction patterns suggested intercalation for Nanomer® I.28E and exfoliation for Cloisite® 30B, scanning electron micrographs taken at low magnification indicated existence of nanoclay aggregates as large as 10 μm. It is believed that the effect of the nanoclay aggregates suppressed the positive effects of exfoliated nanoclay platelets (nanoparticles) and resulted in reduction of strength. Lam et al.,[3] on the other hand, measured the hardness of nanoclay/epoxy composites mixed in an extruder. The authors observed an increase in the hardness of the composites up to 4% nanoclay loading. However, beyond 4% loading, the hardness of the samples decreased drastically. In the same study, increasing nanoclay content is shown to yield significantly larger nanoclay cluster (aggregate) formations in the nanocomposite microstructure.

The strong tendency of nanoparticles to form clumps and clusters ("agglomerates") is a serious technological problem that impedes the effective use of nanoparticles in many applications. Additives which can be used to disperse the nanoparticles can be useful but present their own problems, especially in regard to the purity of the final product.

Thus the inconsistent results and property degradations observed in such nanoclay/thermosetting resin composites is most likely due to insufficient (poor) dispersion and exfoliation of nanoclay platelets within the polymer matrix. Despite a number of available nanoclays with modified surfaces, complete exfoliation of nanoclay in epoxy matrices could not be achieved. Solution blending, melt mixing and in-situ polymerization have been the primary methods to introduce nanoclay into polymer matrix. However, regardless of the method, nanoclay is first mixed into the liquid resin. Several mixing methods such as ultrasonic mixing and shear mixing have been used. Among such studies a three-roll mill machine is used by Yasmin et al.[4] to mix nanoclay into epoxy matrix. However expected improvements in thermo-physical properties could not be achieved. Lam et al.[5] on the other hand, investigated the effect of sonication time on the hardness of nanoclay/epoxy samples. Interestingly, Lam et al. observed significant deterioration in hardness for sonication times greater than 10 minutes. Aktas et al.[6] investigated the effect of several processing parameters such as mixing temperature, nanoclay type and nanoclay content on the quality of dispersion by a combination of image analysis and wavelength dispersive spectrometry. Despite certain improvements in the quality of dispersion for a set of processing parameters, complete exfoliation could not be achieved.

In view of the above, more effective methods of dispersing/mixing nanoparticles on or in substrates or base materials is therefore highly desired.

SUMMARY

Figure 1:
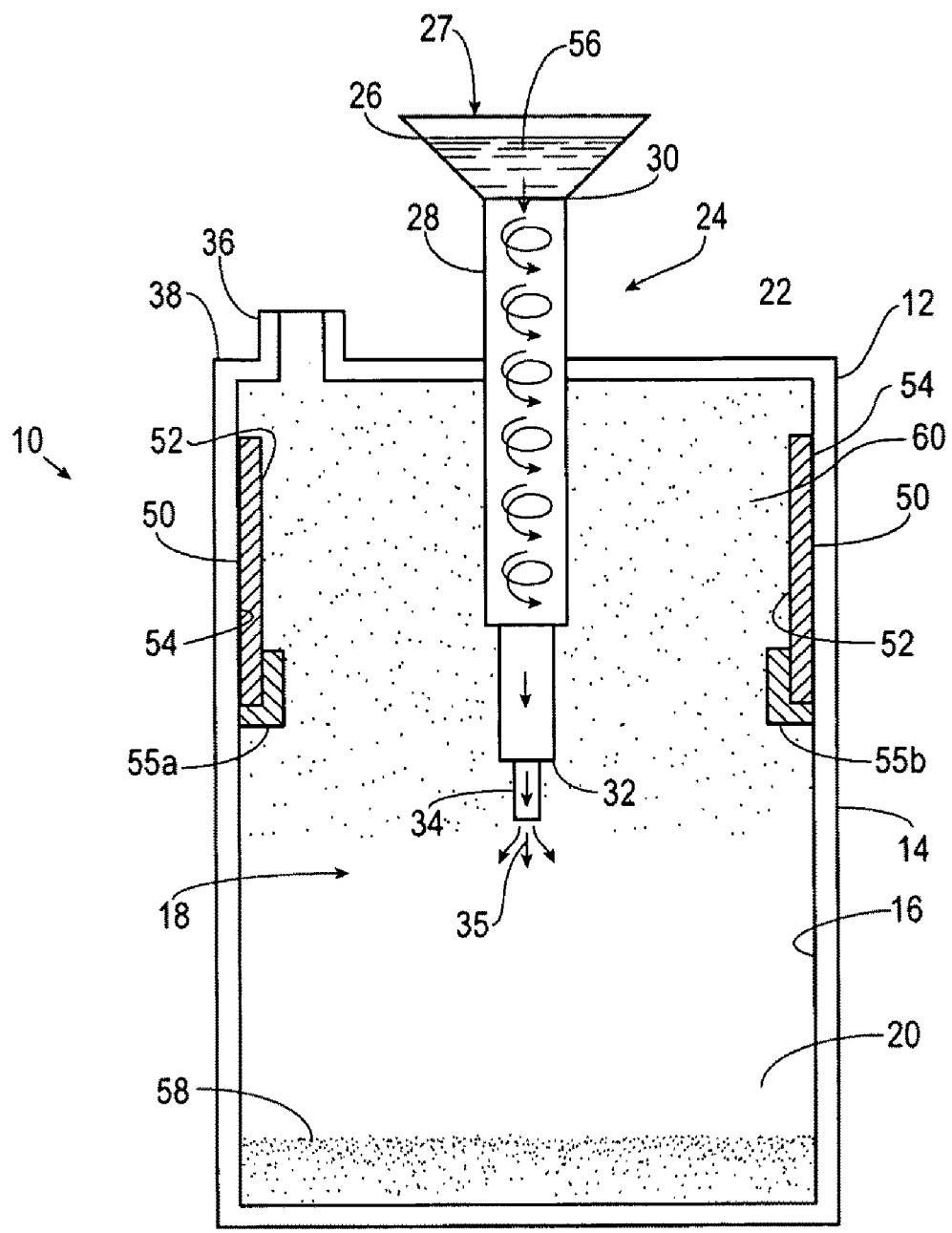
FIG. 1 is a diagram of the deposition chamber used to deposit nanoparticles on a deposition substrate in accordance with the present invention.

The strong tendency of nanoparticles to form clumps and clusters ("agglomerates") is a serious technological problem that impedes the effective use of nanoparticles in many applications. Additives which can be used to disperse the nanoparticles can be useful but present their own problems, especially in regard to the purity of the final product. The present invention is a process for separating nanoparticles from clumps, clusters and foreign materials thereby uniformly depositing materials having nano-sized particles smaller than 1 μm (i.e., nanomaterials) onto a surface of a base material (substrate or surface). The process is used to deposit any solid (nanoparticle) of any shape such as nanofibers, nanotubes (such as single walled, double walled and multiwalled), nanoclays (e.g., smectites and montmorillonites), nano-spheres, nanopowders, or irregularly shaped granules. The base material upon which the nano-particles are deposited can be made of any material. The method substantially prevents the deposition on the base material of larger particles (contaminants or clusters of the nanoparticles) which are often mixed with or formed by the nanomaterials. The amount of deposition and the range of particle sizes to be deposited can also be controlled by this method. Maintaining deposition uniformity, controlling the amount of deposition, and the elimination of larger particles enhances the utility of nanomaterials, and by subsequent processing, enables the development of multifunctional composite materials (or other coated substrates) to be used in commercial applications. It is therefore an objective of the present invention to overcome shortcomings of current technologies for applying nanoparticles to other base materials by substantially eliminating deposition of larger clusters or aggregates of nano-sized materials or other large impurities of other materials upon or in the base materials by suitably positioning the base material with respect to an ejection port located within a deposition chamber.

DESCRIPTION OF THE INVENTION

The present invention is a process for depositing solid nanomaterial particles (nanoparticles) of any type and shape onto or into another base material (surface or substrate). The base material on which or into which the nanomaterial particles are deposited are preferably used later to make larger parts by conventional manufacturing methods. The process is used to deposit any solid (nanoparticle) of any shape such as nanofibers, nanotubes (such as single walled, double walled and multiwalled), nanoclays (e.g., smectites and montmorillonites), nano-spheres, nanopowders, or irregularly shaped granules. The base material upon which the nano-particles are deposited can be made of any material and can be in solid or liquid phase or a mixture of both during deposition. The method substantially prevents the deposition on the base material of larger particles (contaminants or clusters of the nanoparticles) which are often mixed with or formed by the nanomaterials. The amount of deposition and the range of particle sizes to be deposited can also be controlled by this method. Maintaining deposition uniformity, controlling the amount of deposition, and the elimination of larger particles enhances the utility of nanomaterials, and by subsequent processing, enables the development of multifunctional composite materials (or other coated substrates) to be used in commercial applications.

The term "nanomaterial" as used herein refers to a material comprising nanoparticles and nanomaterial clusters. A nanoparticle is defined herein as a material or particle wherein the largest dimension of an individual solid particle is equal to or less than 1 μm (1000 nm). For example, a carbon nanotube may have a diameter of 10 nm and the length of 800 nm, or a platelet-shaped nanoclay particle may have a thickness of 2 nm and planar dimensions of 750 nm. More preferably the nanoparticles have maximum dimensions less than 500 nm, 100 nm, 50 nm, 10 nm, or 1 nm. The term "nanomaterial cluster" as used herein means A particle having A maximum dimension exceeding 1 μm and may constitute a nanoparticle aggregate, cluster, or agglomerate (or other particulate foreign material not formed from nanoparticles). Uniformly depositing such nanoparticles onto another base material surface, controlling the amount of nanoparticle deposition and excluding deposition of nanomaterial clusters on the base material is what is achieved with this invention.

The process of the present invention uses a container assembly which contains the base material (i.e., the material, substrate or surface, also referred to herein as a deposition substrate, onto which the nanoparticles are to be deposited). FIG. 1 shows the basic components of one non-limiting embodiment this container assembly referred to therein by the general reference numeral 10.

The container assembly 10 is constructed of a deposition chamber 12 having an outer wall 14, an inner wall 16, and an inner space 18. The deposition chamber 12 has a lower inner portion 20 and an upper inner portion 22. The container assembly 10 further comprises a nanomaterial delivery assembly 24 comprising a hopper 26, and a static mixer 28 having an upper end 30 connected to the hopper 26 and a lower end 32 terminating in a needle 34 (or other narrow tube) having an orifice 35. The deposition chamber 12 optionally further comprises at least one closeable aperture 36, preferably near an upper end 38 of the deposition chamber 12. In a preferred embodiment the aperture 36 is connected to a vacuum generator (not shown) for creating a reduced pressure in the inner space 18 of the deposition chamber 12. Shown within the deposition chamber 12 are two deposition substrates 50, each of which is positioned on or near a portion of the inner wall 16 within the upper inner portion 22 of the deposition chamber 12 wherein each has an exposed surface 52. Each deposition substrate 50 may be placed against the inner wall 16 so a concealed surface portion 54 of the deposition substrate 50 is not exposed to the inner space 18, or each deposition substrate 50 may be positioned so that the exposed surface portion 52 comprises substantially the entire deposition substrate 50 and the concealed surface portion 54 comprises only a small surface of the deposition substrate 50 which is connected to the inner wall 16. The deposition substrate 50 may be contained or supported by a deposition substrate container 55 which may have a heating mechanism for heating the deposition substrate 54. In use, the hopper 26 may be filled with a nanomaterial 56 (which may comprise one or more different types of nanomaterials). The hopper 26 will be understood by a person of ordinary skill in the art to be any mechanism or container or feeding mechanism for providing a source of nanomaterial 56 to the static mixer 28 for delivery into the deposition chamber 12.

The nanomaterial 56 to be deposited is placed in the hopper 26 (or other holding structure or nanomaterial source constructed in accordance with the present invention). The nanomaterial 56 to be deposited on the deposition substrate 50 needs to be in solid state and can be of any shape. For example, the nanomaterial 56 may comprise clusters, granules, spheres, fibers, tubes, or platelets. The hopper 26 can accommodate more than one type or shape of nanomaterial 56. For example, carbon nanotubes and nanoclay mixture can be placed together into the hopper 26. The size and shape of the hopper 26 is not limiting and can be any size which enables it to function in accordance with the present invention.

The hopper 26, as noted, is connected to the static mixer 28. The static mixer 28 has a narrow passageway for the nanomaterial 56 as it moves into the inner space 18 of the deposition chamber 12 from the hopper 26. The function of the static mixer 28 is to break up the larger clusters or aggregates of the nanomaterial 56 and to expel the processed nanomaterial 56 into the inner space 18. There can be more than one static mixer 28 in the container assembly 10, as described for FIG. 2 below, which yield smaller passage channels if desired.

The needle 34 (or other tube) with the narrow orifice 35 is attached at the lower end 32 of the static mixer 28 and is oriented in a direction toward the lower inner portion 20 of the deposition chamber 12. The needle 34 is a hollow passageway through which the nanomaterial 56 moves into the inner space 18 of the deposition chamber 12. The inner and outer diameters of the needle 34 are not critical, though it is preferred that the needle inner diameter of the needle 34 is less than 1 mm (1,000 µm). Static mixers 28 and needles 34 are commercially available.

As noted above, the aperture 36 serves as a vacuum port used to connect the deposition chamber 12 to a vacuum source for lowering the pressure in the inner space 18 of the deposition chamber 12 to levels below atmospheric pressure or to levels below the ambient pressure external to the deposition chamber 12. Preferably an upper end 27 of the hopper 26 is closed to maintain vacuum pressure inside the deposition chamber 12 after the pressure has been lowered therein. The level of vacuum pressure in the inner space 18 is not a critical parameter, i.e., it is not essential to reach very low levels of vacuum pressure.

Furthermore, it is also possible to maintain the inner space 18 of the deposition chamber 12 at atmospheric pressure, while subjecting the hopper 26 to an external pressure exceeding atmospheric pressure thereby forcing the nanomaterial 56 into the deposition chamber 12. In this case, when using an external pressure source, pressure levels required will not be high, possibly much less than 100 psi, which can be supplied by a relatively inexpensive air compressor. In summary, the input of nanomaterial 56 into the deposition chamber 12 takes place due to a lower pressure in the inner space 18 as compared to the pressure external to the deposition chamber 12, i.e., a pressure differential.

After the desired pressure differential is achieved and a lower end of the hopper 26 is opened, air flow (or flow of other gas) takes place from outside into the inner space 18 of the deposition chamber 12. This flow is due to the pressure differential and may be completed within seconds depending on the size of the deposition chamber 12 and the pressure differential. During this flow process, the nanomaterial 56 is carried into the inner space 18 of the deposition chamber 12 by the air movement. Nanomaterial clusters 58 of the nanomaterial 56 tend to move towards the lower inner portion 20 of the deposition chamber 12 due to gravity and the momentum gained during the flow and accumulate there, nanoparticles 60 of the nanomaterial 56 are carried up into the upper inner portion 22 following the trajectory of the air flow (or flow of any other gas or gaseous medium in the inner space 18) and are suspended therein. Any gas or mixture of gases may be used including, but not limited to, oxygen, nitrogen, argon, neon methane, helium, hydrogen, carbon monoxide, ethylene, and carbon dioxide, and mixtures thereof. A mixture of various gases can be used too. By using various gases different size distributions of nanoparticles 60 for deposition can be obtained as the viscosity of various gases or mixtures of gases will affect the flow and suspension behavior due to the change in viscous drag on the nanoparticles 60. In less viscous gases, larger sized nanoparticles 60 or nanomaterial clusters 58 may be carried further away from the ejection orifice 35 without settling.

After the pressure inside the deposition chamber 12 becomes equal to the external pressure outside of the deposition chamber 12, the air flow stops. During this process, the inner space 18 of the deposition chamber 12 becomes cloudy due to the suspended particles of nanomaterial 56 in the air therein. It takes several minutes for the deposition chamber 12 to become clear again as the nanomaterial clusters 58 slowly settle due to gravity. Nanoparticles 60 are lifted up by the air flow (or gas) and remain suspended in air (or other gas) in the upper inner portion 22 within the deposition chamber 12 longer than the nanomaterial clusters 58. Many of the nanoparticles 60 will be deposited on the exposed surface 52 of the deposition substrate 50 which, as noted previously, is placed near the inner wall 16 of the deposition chamber 12. In one embodiment the deposition substrate 50 is a "prepreg", a term used in the composites industry for the layers of fibers impregnated with a polymeric resin. Prepregs are used to manufacture products made of polymeric composite materials by the so-called autoclave curing process. To demonstrate this invention, we first deposited nanoclay onto the surface of glass fiber/epoxy resin prepregs, and then fabricated a composite laminate using these prepregs by autoclave curing. Any suitable material may be used in place of a prepreg. Orientation of the surfaces to be deposited on can be vertical as shown in FIGS. 1 and 2 or horizontal or any other angle to achieve the desired deposition characteristics such as size distribution of nanoparticles 60 and deposition amount measured by either weight or percentage of the area covered by the nanoparticles 60.

An important aspect of the invention is the position of the needle orifice 35 of the needle 34 with respect to the deposition substrate 50 on which the nanomaterial 56 is to be deposited. If the exposed surface 52 is close to or right under the needle orifice 35, nanomaterial clusters 58 coming out the needle 34 can be deposited thereon in addition to the nanoparticles 60. However, if the exposed surface 52 to be deposited upon is placed above the needle orifice 35 as shown in FIG. 1, only those particles which are small enough to be lifted up by the local air flow (substantially only nanoparticles 60) will be deposited onto the exposed surface 52 of the deposition substrate 50. Minute thermal fluctuations or the Brownian motion will help these nanoparticles 60 stay suspended in the air within the inner space 18 of the deposition chamber 12 even after the air flow is stopped a nanomaterial 56 is no longer introduced from the hopper 26.

Two mechanisms may contribute to the prevention of the deposition of nanomaterial clusters 58 onto the deposition substrate 50. The first mechanism is velocity (or the momentum) of the particles gained during the air flow. This velocity can be adjusted by the design of the static mixer 28 and the applied pressure differential. Due to the exit velocity from the static mixer 28, nanomaterial clusters 58 (but still smaller than 0.5 mm, since needle 34 has, e.g., a 0.5 mm inner diameter) will accelerate down and impact the lower inner portion 20 of the deposition chamber 12. The second mechanism that prevents nanomaterial clusters 58 from moving up towards the deposition substrate 50 is gravity. Since the density of the nanomaterial 56 is greater than that of air, heavier nanomaterial clusters 58 will naturally tend to settle towards the lower inner portion 20. Although not necessary, the process of the present invention can occur at elevated temperatures, for example when molten thermoplastics are used as the deposition substrate 50 and contained in the deposition substrate container 55 within the deposition chamber 12. The process of the present invention is not limited to a batch process but can be constructed as a continuous deposition or coating process where the nanoparticles 60 are introduced at the desired rate and new deposition substrate 50 to be deposited on is continuously intermittently introduced into the deposition chamber 12 as needed without stopping the process, while the nanomaterial clusters 58 which accumulate on the lower inner portion 20 are removed as well to prevent excess accumulation thereof.

By adjusting the process parameters, one can select the size distribution of the nanoparticles 60 (or even nanomaterial clusters 58) to be deposited onto the deposition substrate 50. The size uniformity of the nanoparticles 60 increases as the deposition substrate 50 is positioned further away from the orifice 35. However, nanomaterial clusters, e.g., having maximum dimensions >1 µm, >5 µm, or >10 µm can be deposited on the deposition substrate 50 if the deposition substrate 50 is placed near the orifice 35, or at a height below the orifice 35. This will increase the deposition rate; however the degree uniformity of size of the deposited particle will be reduced, and the size of particle deposited will be increased.

The innovations of the present invention thus include, but are not limited to: (i) use of a pressure difference to cause movement of the nano-scale materials (nanomaterial 56); (ii) introducing these particles into a deposition chamber 12; (iii) separation of the particles of the nanomaterial 56 based on their sizes as a result of their velocity and the effect of gravity on these particles; and (iv) having only nanoparticles 60 deposited on the exposed surface 52 of the deposition substrate 50.

In an alternative embodiment the apparatus used herein is a container assembly 10a constructed of a pair of deposition chambers 12a and 12b, each having an outer wall 14a and 14b, respectively, an inner wall 16a and 16b, respectively, and an inner space 18a and 18b, respectively. The deposition chambers 12a and 12b each have a lower inner portion 20a and 20b, respectively, and an upper inner portion 22a and 22b, respectively. The container assembly 10a further comprises a pair of nanomaterial delivery assemblies 24a and 24b, each comprising a hopper 26a and 26b, respectively, and a static mixer 28a and 28b, respectively, each having an upper end 30a and 30b, respectively, connected to the hopper 26a and 26b, respectively, and a lower end 32a and 32b, respectively, terminating in a needle 34a and 34b, respectively, (or other tube) each having an orifice 35a and 35b, respectively. Each deposition chamber 12a and 12b optionally further comprises a closeable aperture 36a and 36b, respectively, preferably near an upper end 38a and 38b of the deposition chamber 12a and 12b, respectively. In a preferred embodiment the apertures 36a and 36b are connected to a vacuum generator (not shown) for creating a reduced pressure in the inner space 18a and 18b, respectively, of the deposition chamber 12a and 12b. Shown within the deposition chamber 12a and 12b are deposition substrates 50a and 50b, respectively, each of which is positioned on or near a portion of the inner wall 16a and 16b, respectively, within the upper inner portion 22a and 22b wherein each has exposed surfaces 52a and 52b, respectively. Each deposition substrate 50a and 50b may be placed against the inner wall 16a and 16b, respectively, so a concealed surface portion 54a and 54b of the deposition substrate 50a and 50b is not exposed to the inner space 18a and 18b, or each deposition substrate 50a and 50b may be positioned so that the exposed surface portion 52a and 52b comprises substantially the entire deposition substrate 50a and 50b, respectively, and the concealed surface portion 54a and 54b comprises only a small surface of the deposition substrate 50a and 50b, respectively, which is connected to the inner wall 16a and 16b, respectively. The deposition substrates 50a and 50b may be contained or supported by deposition substrate containers 55a and 55b, respectively, which may have heating mechanisms for heating the deposition substrates 50a and 50b therein, respectively. In use, the hopper 26a and 26b may be filled with a nanomaterial 56a and 56b (each of which may comprise one or more different types of nanomaterials). The hopper 26a and 26b will be understood by a person of ordinary skill in the art to be any mechanism or container or feeding mechanism for providing a source of nanomaterial 56a and 56b to the static mixer 28a and 28b, respectively, for delivery into the deposition chamber 12a and 12b, respectively.

Other embodiments of the apparatus may be constructed to have more than two deposition chambers 12a and 12b and nanomaterial delivery assemblies 24a and 24b in a manner which will now be apparent to a person having ordinary skill in the art. Furthermore, the nanomaterial delivery assemblies 24, 24a and 24b (or others constructed in accordance with the present invention) do not necessarily contain straight and vertical passages. Curved or helical tubes, needles, or flow channels can be used to accelerate the nanomaterial 56 to enhance the cluster break up. The flow area therein (i.e., cross-sectional profile of the flow channels) can be of any shape including square, rectangular or other irregular shapes to create flow disturbances leading higher inertia forces and viscous forces to facilitate improved cluster break up.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples, which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

Figure 2:
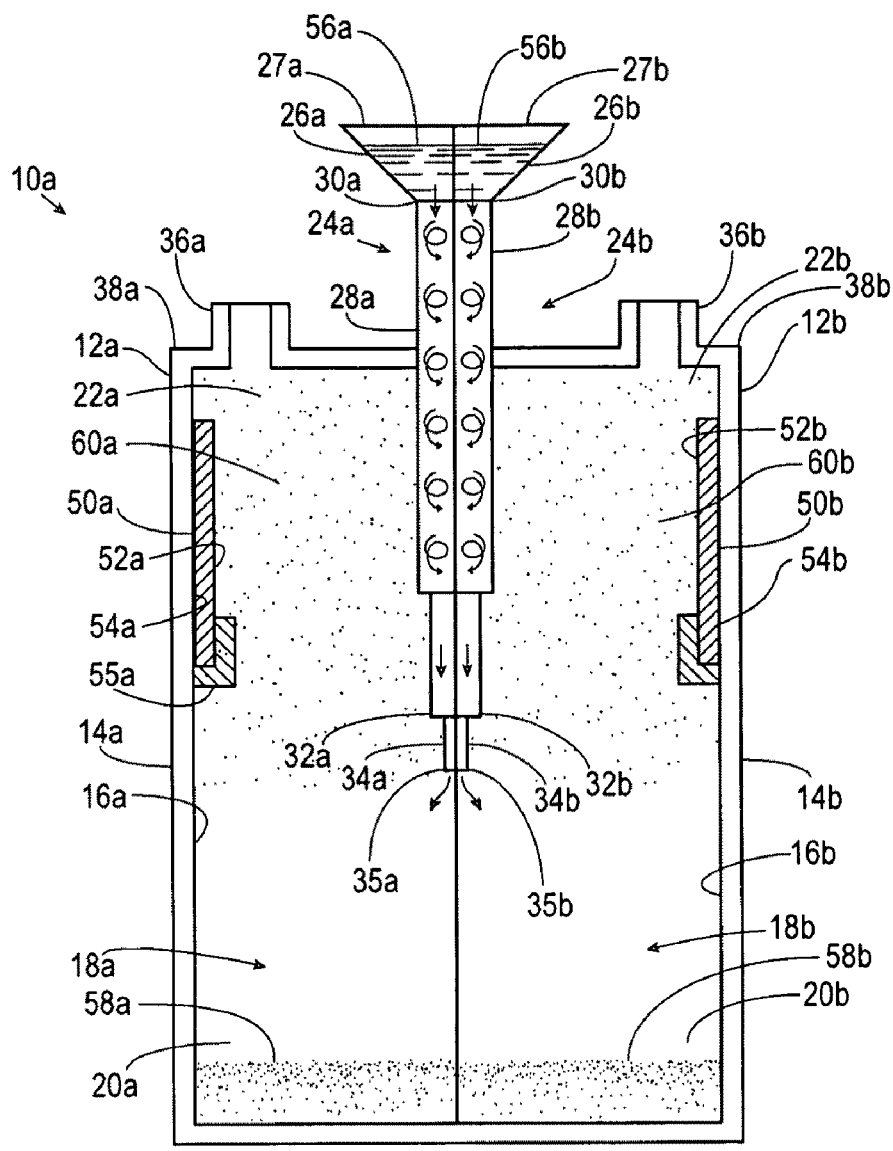
FIG. 2 is a diagram of an alternative deposition chamber used in accordance with the present invention.

In one example, a method for introducing nanoparticles comprising nanoclay (fine clay particles) onto commercially-available prepregs (deposition substrates) to form epoxy matrix composites. The method involves vacuum-assisted deposition of the fine clay particles directly onto the surface of the prepregs. A deposition chamber is used as shown above (e.g., as shown in FIG. 1 or 2) that is capable of breaking down the nanoclay particles by subjecting them to shear and depositing them uniformly onto the prepregs at room temperature (or at an elevated temperature). By using the deposition chamber, a thin layer of nanoclay is deposited on 101.6 mm×101.6 mm woven glass/epoxy prepregs. Twelve of these prepregs are stacked and cured by an autoclave at a temperature of 121° C. under a constant pressure of 0.2 MPa (30 psi) for 1 hour. Other curing conditions may be used.

After the curing is complete, the laminates are cut into 10.8 mm×31.7 mm samples for three-point bending tests, glass transition temperature measurements and microstructural characterization. The improvements in mechanical properties such as flexural strength, flexural stiffness, and glass transition temperature by the addition of nanoclay are presented. Nanocomposite morphology is studied by light microscopy and scanning electron microscopy.

Marginal improvements in mechanical properties are observed with only 0.6% nanoclay content. The flexural stiffness improved by 4% while maintaining the flexural strength constant at around 400 MPa. Glass transition temperature is measured as 128° C. for samples with and without nanoclay. However, significant differences in microstructure are observed. Although both samples contain micro-voids, these voids are observed to be more extensive in samples involving nanoclay.

In the present work, mechanical properties of nanocomposites fabricated by vacuum assisted deposition were characterized by three-point bending tests. The change in glass transition temperature due to nanoclay was measured by dynamic mechanical analyses. The microstructure of the nanocomposite samples were characterized by light microscopy at 50× and 200× magnifications and by high resolution scanning electron microscopy up to 20,000× magnification.

The deposition chamber 12 (or 12a and 12b) or other deposition chamber which is preferably used herein is constructed of a vacuum tight container (such as shown in FIGS. 1 and 2) and a custom built nanoclay (nanomaterial) transport line (as described above). The transport line was built by connecting two in-line static mixers with diameters 6.3 mm and 3.2 mm, respectively (e.g., as shown in FIG. 2). The nanoclay transport line was terminated by a 0.8 mm-diameter needle 34 to increase the shear force on the nanoclay clusters (56) and act as a final breakdown mechanism before deposition.

In addition to the nanoclay transport line, the cylinder shaped 101.6 mm-diameter deposition chamber 12, 12a or 12b has an aperture 36, 36a or 36b for vacuum. The prepregs (e.g., deposition substrates 50, 50a or 50b) were placed along the inner wall 16, 16a or 16b of the deposition chamber 12, 12a or 12b and allowed to stabilize at room temperature after being removed from the freezer. As shown in FIGS. 1 and 2, the prepregs were positioned above the level of the needle 34, 34a or 34b to prevent non-uniform deposition. As the prepregs warmed up to the ambient temperature, the deposition chamber 12, 12a or 12b was closed, and the vacuum line was operated to evacuate the air inside the deposition chamber 12, 12a or 12b. Upon completion of the evacuation, nanoclay (nanomaterial 56, 56a or 56b) was placed into the hopper 26, 26a or 26b positioned on the static mixer (FIGS. 1 and 2). Due to the pressure gradient between the ambient and the inner space 18, 18a or 18b of the deposition chamber 12, 12a or 12b, nanoclay material was quickly drawn into the deposition chamber 12, 12a or 12b through the transport line, forming a cloud of nanoclay nanoparticles 60, 60a or 60b. After the nanoclay nanoparticles 60, 60a or 60b were introduced, the deposition chamber 12, 12a or 12b was kept closed for 10 minutes to allow nanoclay particles 60, 60a or 60b to adhere onto already tacky prepregs 50, 50a or 50b. The prepregs 50, 50a or 50b were weighed before and after nanoclay deposition to determine the nanoclay content of the test samples.

With the method described in the previous section, a total of 12 woven glass/epoxy prepregs with dimensions 101.6 mm×101.6 mm were deposited with Cloisite® 30B. These prepregs were stacked together to form a laminate and cured in an autoclave as per the manufacturer suggested temperature profile. During the cure cycle, the temperature was raised at a rate of 5° C./min from ambient to 121° C. (250° F.), and then the laminate was held at 121° C. for 1 h and cooled down to 50° C. before the autoclave door was opened and the sample was removed. Throughout the cure cycle a constant pressure of 0.2 MPa (30 psi) was applied. For comparison, a total of two laminates were cured during the same cure cycle, one with and one without nanoclay particles. The laminates with nanoclay are referred to herein as nanocomposites and laminates without nanoclay will be referred to as composites herein.

Test coupons for mechanical and thermal analysis were prepared from both laminates using Buehler Isomet 2000 precision saw. A total of 10 samples with average dimensions of 31.75 mm×10.8 mm with a thickness of 4 mm were obtained. Six samples from both composite and nanocomposite laminates were tested under three-point bending and 4 samples were used to determine glass transition temperature by dynamic mechanical analysis. Three-point bending was performed on a 5-kip Com-Ten testing machine with a span of 25.4 mm at a constant speed of 2 mm/min.

Glass transition temperature of the composite and nanocomposite samples were determined by RDAIII (Rheometrics Digital Analyzer). As the temperature was raised at a rate of 1° C./min from 50° C. to 180° C., the samples were subjected to a sinusoidal torsional deformation with a strain amplitude and a frequency of 0.05° and 1 Hz., respectively. During the cycle, storage modulus, loss modulus and temperature were recorded. Glass transition temperature was determined using the peak tangent delta method.

The microstructure of the composite (without nanoparticles) and nanocomposite (with nanoparticles) samples were observed using light microscopy and scanning electron microscopy. For light microscopy, one sample from both composite and nanocomposite laminates was imbedded into a quick cure acrylic resin for easy handling during sample preparation. The samples were polished using a set of aluminum oxide sand papers (grits 600, 1500 and 2000, successively). Following the sand paper polishing, silicon carbide pastes with grit sizes 800 and 1200 were applied by a polishing cloth. The microstructure was observed with a Meiji metallurgical microscope at 50× and 200× magnifications.

Scanning electron microscopy was used to investigate the microstructure of the composite and nanocomposite samples at higher resolutions. Composite and nanocomposite samples were polished with aluminum oxide lapping films down to 1 µm grit size. Prior to scanning electron microscopy, the samples were coated with gold-palladium to prevent charging during imaging. Images at magnifications ranging from 50× to 20,000× were captured using JEOL-880 high resolution SEM in back scattered electron mode.

Mechanical properties of the composite and nanocomposite laminates were characterized by performing three-point bending tests. The stress strain diagram of representative samples for the composite and nanocomposite laminates are shown in FIG. 3.

Figure 3:
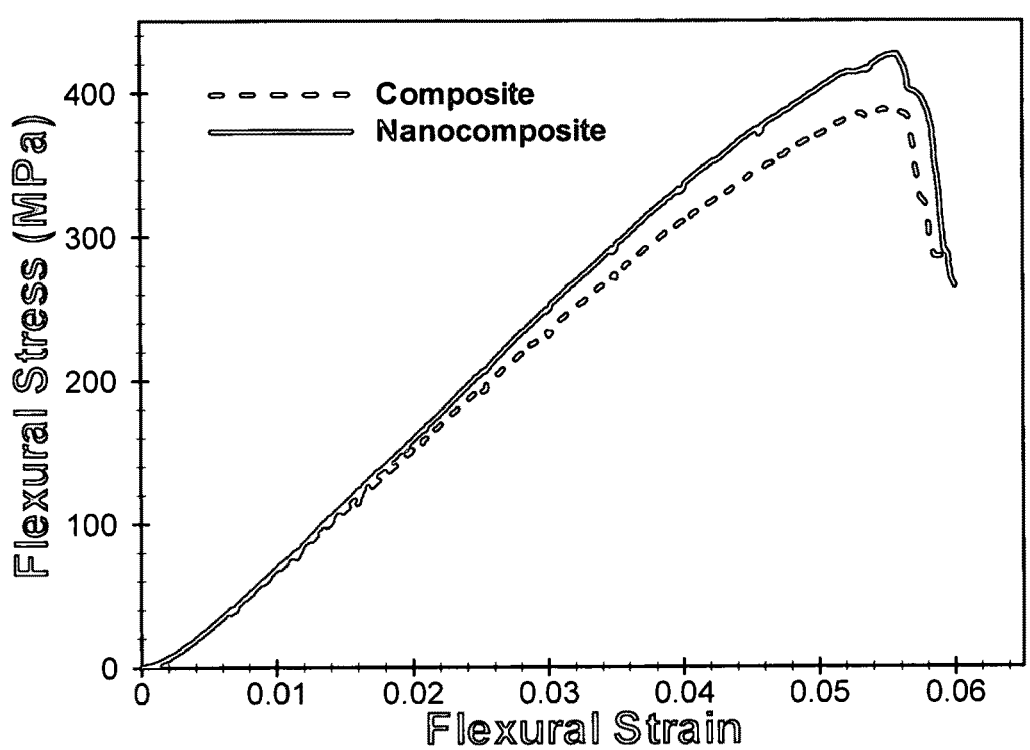
FIG. 3 is a stress-strain diagram of representative composite and nanocomposite samples.

It can be observed from FIG. 3 that the deposition of nanoclay particles onto the prepregs prior to autoclave molding resulted in marginal improvements in mechanical properties. The nanoclay content of the nanocomposite laminate was determined as 0.6% by gravimetric measurements before and after deposition. It was interesting to observe that such small amount of nanoclay deposition manifested itself in the mechanical performance of the final parts.

Figure 4:
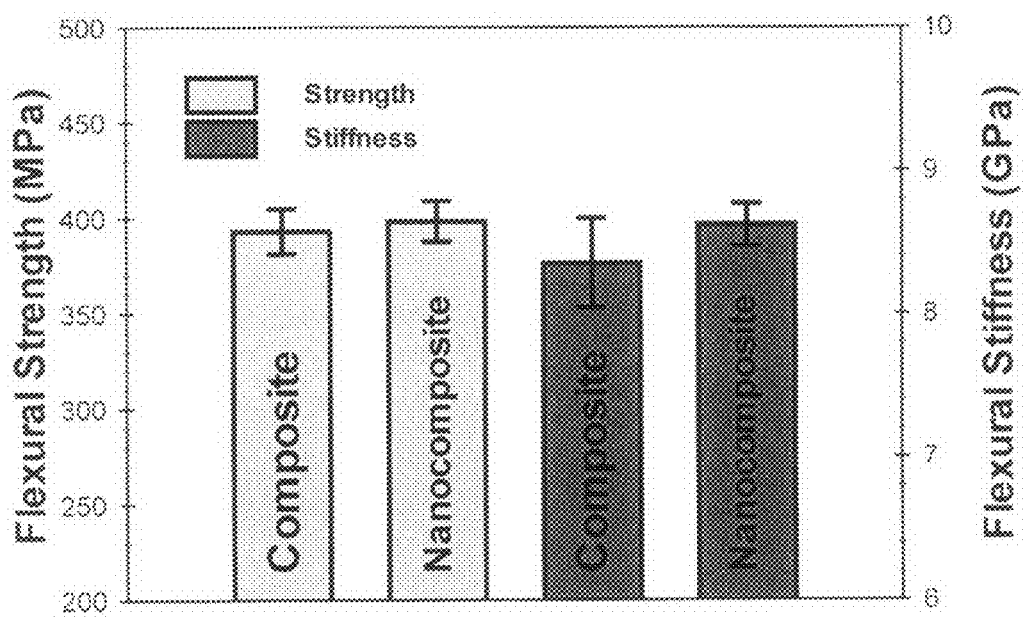
FIG. 4 is a bar graph of flexural strength and stiffness of the composite and nanocomposite samples.

The flexural strength and stiffness of composite and nanocomposite samples are depicted in FIG. 4. The values shown in FIG. 4 are averages of 6 samples and the error bars represent 95% confidence intervals. The flexural strength is observed to improve slightly with the addition of nanoclay from 393.2 MPa to 398.4 MPa. On the other hand, flexural stiffness displayed a more pronounced increase of up to 4% from an 8.35 GPa for the composite sample to 8.62 GPa for the nanocomposite.

Figure 5:
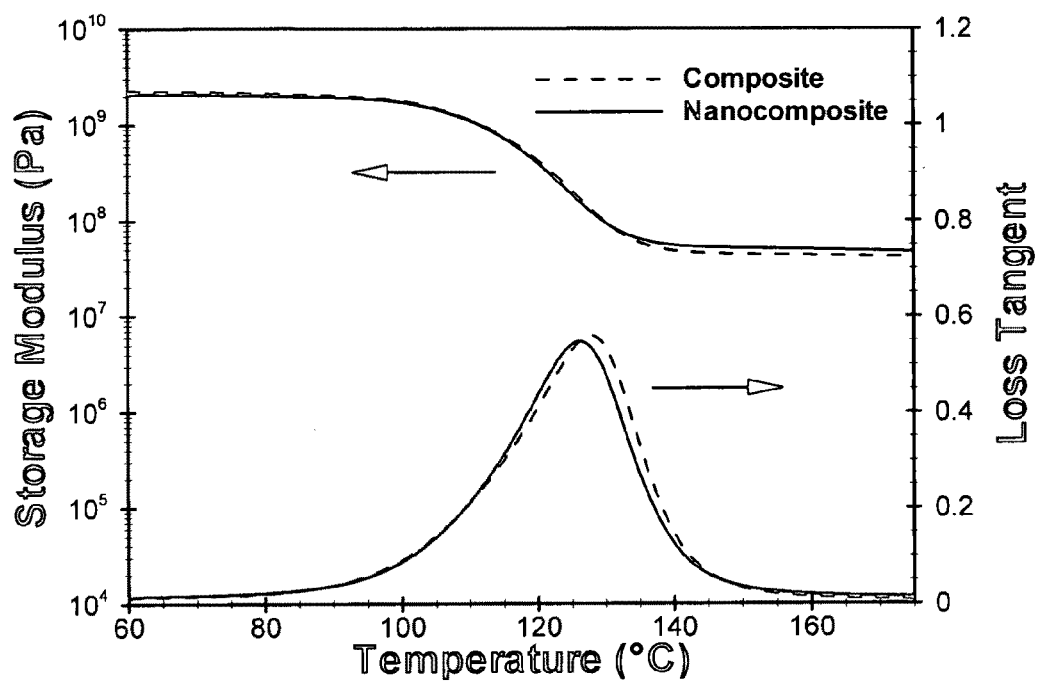
FIG. 5 is a graph showing evolution of storage modulus and loss tangent during glass transition.

Glass transition temperatures of the composite and nanocomposite samples were determined by dynamic mechanical analysis. FIG. 5 depicts the evolution of storage modulus and loss tangent as a function of temperature. Glass transition temperature was determined by three methods using dynamic mechanical analysis: i) the onset of sudden drop in storage modulus, ii) the peak of loss tangent curve and iii) the peak of loss modulus curve. The glass transition temperatures in this study was determined by the peak loss modulus method.

Figure 6:
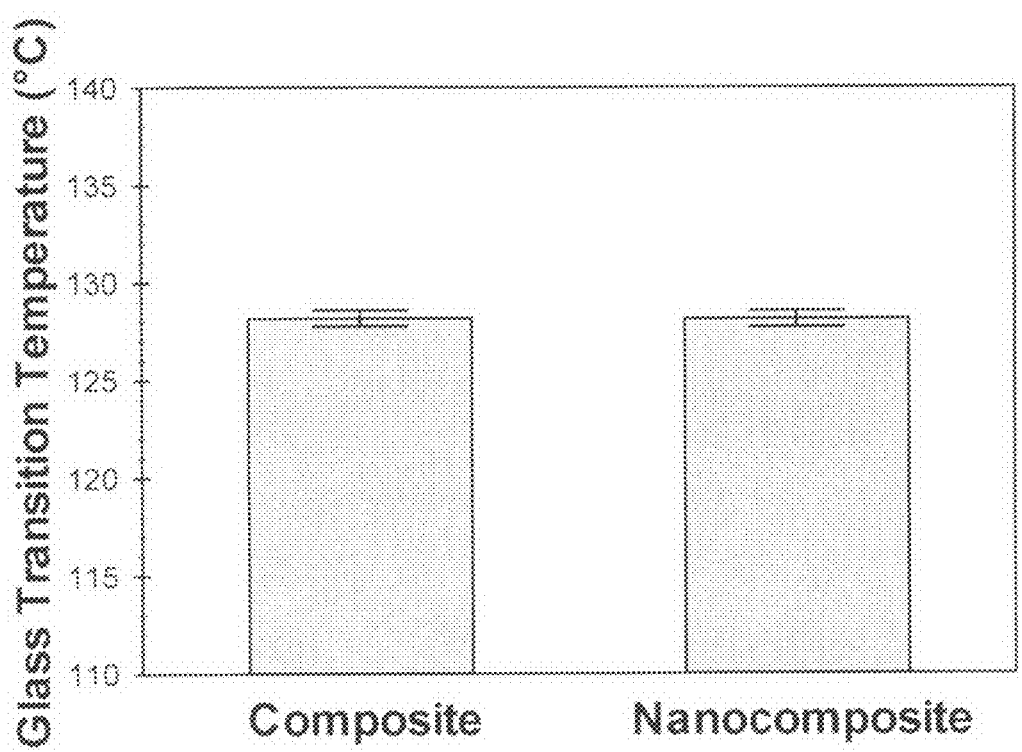
FIG. 6 is a bar graph showing glass transition temperatures of the composite and nanocomposite samples determined by peak loss tangent method.

The loss tangent and storage modulus curves for the composite and nanocomposite samples are observed to almost overlap (FIG. 5). FIG. 6 depicts the glass transition temperatures of composite and nanocomposite samples determined from FIG. 5 which indicates that the effect of nanoclay deposition on the glass transition temperature was negligible. Glass transition temperature for both samples was determined as 128° C. The error bars in FIG. 6 indicated 95% confidence intervals determined from measurements performed on 4 samples.

Figure 7:
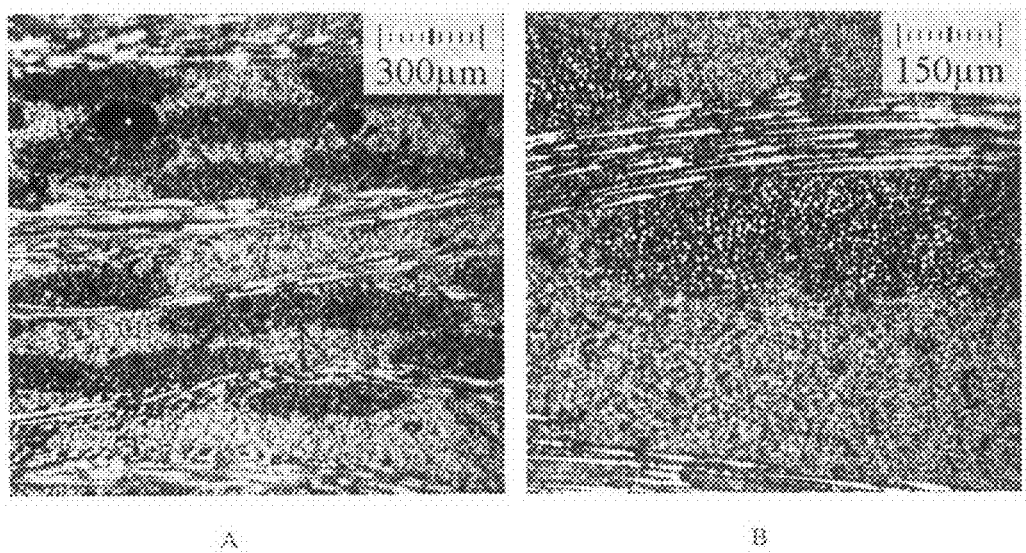
FIG. 7 is a photomicrograph of images of composite sample taken at 50× (A) and 200× (B).

Unlike the glass transition temperature, the microstructure of composite and nanocomposite samples are distinct. FIG. 7 shows light microscope images of the microstructure of the composite sample, taken at 50× and 200× magnifications. Although cured with a vacuum bag and at an autoclave pressure of 30 psi several voids with sizes up to 300 µm are observed between the fiber tows. One such void is shown in the low magnification image in FIG. 7. However, for the composite samples formation of micro-defects in the resin rich areas is rare.

Figure 8:
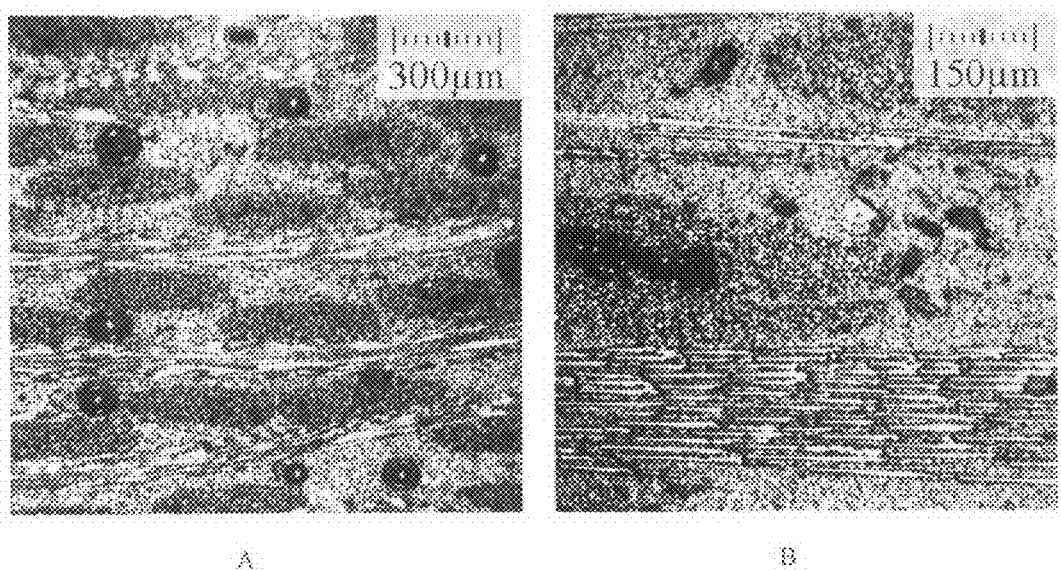
FIG. 8 is a photomicrograph of images of nanocomposite sample taken at 50× (A) and 200× (B).

The nanocomposite sample, as shown in FIG. 8, has higher void content. The void sizes are observed to be smaller than that of the composite samples; however they are greater in quantity. Low magnification image in FIG. 8 depicts voids with sizes up to 100 µm are common for the nanocomposite sample. In addition to these voids, nanocomposite samples include several micro-defects in the resin rich areas. These defects are visible in the high magnification image of FIG. 8. These defects are believed to have formed due to the reduced adhesion between prepreg layers due to deposited nanoclay.

Figure 9:
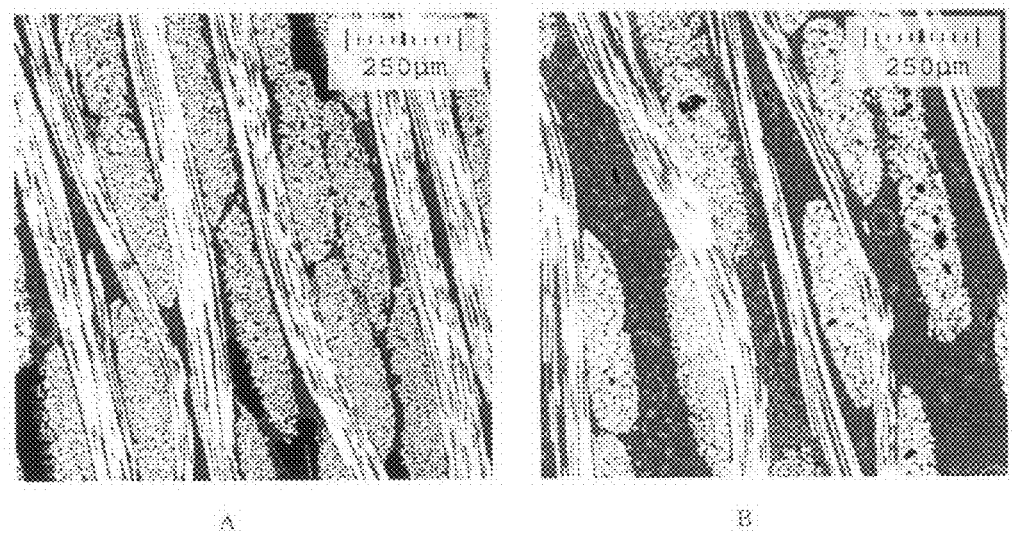
FIG. 9 shows scanning electron microscope images of composite (A) and nanocomposite (B) samples taken at 50×.

Scanning electron microscopy, on the other hand, enables imaging the microstructure at a higher resolution. Especially, backscattered electron imaging yields information about the compositional differences on the microstructure of the sample. FIG. 9 shows the scanning electron micrographs of the composite and nanocomposite samples taken at 50× magnification. Although nanoclay was not identifiable using light microscopy at the same magnification, scanning electron micrographs capture nanoclay clusters with sizes in the order of 110 µm or less.

Figure 10:
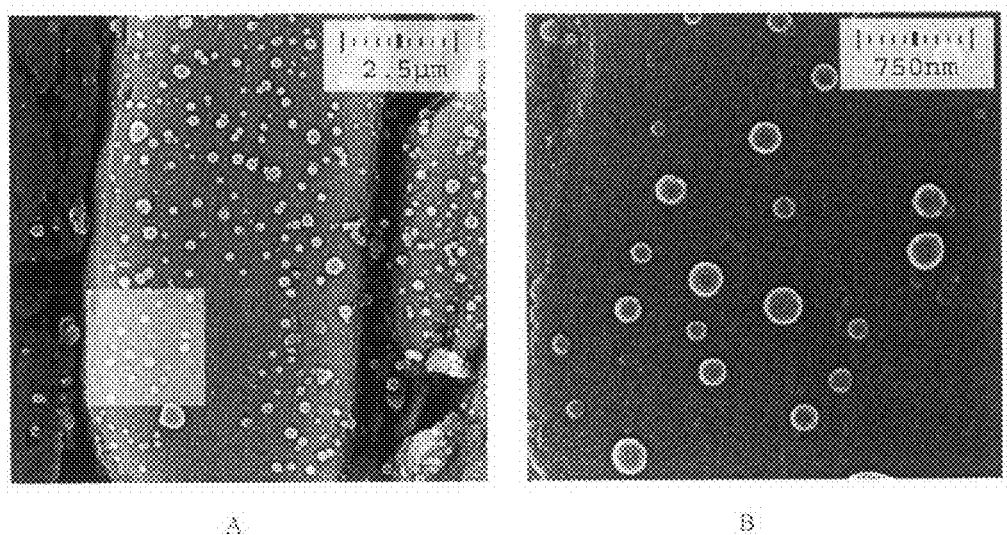
FIG. 10 shows SEM images of nano-scale beads captured and 5,000× (A). In (B) the highlighted region in (A) is shown at 20,000× magnification.

Scanning electron micrographs taken at higher magnifications reveal existence of nanometer scale beads distributed throughout the microstructure of the nanocomposite. These beads are not observed in the composite samples without the nanoclay. A number of nano-beads positioned over a glass fiber are shown in FIG. 10 at 5,000× and 20,000× magnifications. The sizes of the beads ranged from 50 nm to 400 nm. During vacuum deposition, some nanoclay platelets may have been broken down and assumed such smaller sizes. When coated with epoxy resin, these broken nanoclay platelets may have formed the nano-beads observed in FIG. 10. In order to identify the origins of the nano-beads additional characterization should be carried out.

Mechanical properties, obtained from three-point bending tests, were observed to improve slightly due to nanoclay. Flexural stiffness increased by 4% while maintaining the flexural strength constant. The addition of nanoclay did not affect the glass transition temperature. The glass transition temperature of both laminates with and without nanoclay was measured as 128° C.

The microstructural features, however, were observed to be distinct for samples with and without nanoclay. Compared to samples without nanoclay, samples with nanoclay have higher void content with microstructural defects appearing in the matrix rich areas. Nanoclay clusters with sizes around 10 µm as well as nano-beads in the range of 50 to 400 nm were observed with scanning electron microscopy.

Utility

The strong tendency of nanoparticles to form clumps, clusters and agglomerates (nanomaterial clusters) is a serious technological problem that impedes the effective use of nanoparticles in many applications. Additives which can be used to disperse the nanoparticles can be useful but present their own problems, especially in regard to the purity of the final product. The present invention enables the development of new nanocomposite materials comprising nanoparticles deposited on base materials. The deposition method contemplated herein can be used to make nanocomposites with tailored and significantly better physical and mechanical properties than composites presently available.

The method enables effective incorporation of commercially available nanomaterials (nanoparticles) into polymers or polymeric composites which can subsequently be used to make parts by conventional methods including, but not limited to, injection molding, compression molding, extrusion, and autoclave curing.

Some of the more specific advantages of the present invention include:
1. The process is relatively simple and can be scaleable for commercialization.
2. The deposition technique automatically prevents larger clusters or aggregates of nanoparticles (nanomaterial clusters), or larger impurities from being deposited onto the surface of the base material (deposition substrate).
3. Size distribution of the deposited nanoparticles can be controlled by the proper selection of process parameters such as pressure differentials, and gas type, used in the particle flow.
4. More than one type of nanomaterial or nanoparticle can be deposited at the same time or in series.
5. The process can be automated and multiple deposition shots can be applied to achieve the desired nanomaterial content.
6. Tailoring physical, mechanical, thermal, magnetic, and electrical properties can be possible by the presence of multi-component, multi-scale arrangement of material constituents. (Woven-glass fibers, carbon nanotubes, and nickel nanospheres can coexist in a polymeric matrix for the desired set of properties). As such, many of the current material design space limitations would be lifted.
7. The process does not rely on any phase change of the nanomaterial deposited.
8. No melting, solidification, sublimation or condensation of the nanomaterial to be deposited is required.
9. The process does not use thermal energy, heating or cooling to facilitate the deposition (although the base material may be heated to be raised to a particular temperature or transition state).
10. Electrical or magnetic energy sources are not required to facilitate the separation or deposition of the nanoparticles.

There are possible versions of this process which would target different applications and lead to different commercial applications and products. These versions may require a different process and equipment design. Although the processes may need to be performed differently, all versions use the same principle of utilizing particle velocity and gravity to separate the smaller nano-size particles from the larger ones, and then the placing, depositing, coating, and/or covering another surface with these nano-scale materials. The surface to be covered or deposited can have any shape such as flat, curved, irregular or have a complicated three-dimensional profile.

For example, several different processes having different applications and end products are described below.

Deposition of Nanoparticles on Solid Thermoplastic Pellets or Granules.

Solid granules or pellets are the material form used in plastics extrusion, injection molding, or blending processes. These plastics are usually thermoplastics (as opposed to thermosets) such as nylon, polyethylene, polycarbonate, etc. which can be melted and reshaped and reprocessed. For this case, a container filled with these thermoplastic pellets or granules are placed in a tray or a box (the deposition substrate container). This box can be of any orientation (horizontal or inclined at an angle) and is located within the deposition chamber for example, as described above. The introduction of the nanomaterials into the deposition chamber is performed the same way using a pressure difference (vacuum or positive pressure). The nanoparticles are deposited onto the surface of these thermoplastic pellets or granules. The box containing the pellets can be placed above the injection port such that the size distribution of the particles can be controlled. In order to deposit nanoparticles upon the surface of the pellets, the pellet box may need to be relatively shallow. Also the box can be slowly shaken or vibrated, or the pellets therein can be churned, thus moving and rotating the pellets and enabling the complete coverage of the pellet surface with the nanoparticles. These pellets or granules covered with nanoparticles can then be molded or extruded into a final product using the conventional equipment. Or, they can be mixed with another polymer before further processing.

Depositing Nanoparticles on Liquid Surfaces of Thermoplastic Polymers to Make Dispersions in Molten Thermoplastics.

This process is carried out when the thermoplastics are in the molten state. Depending on the polymer, molten state can be achieved at 80° C. to 350° C. for most thermoplastics. At the melt temperature, the introduction of the nanomaterials is done the same way as described above within the deposition chamber. The heated tank that contains the molten thermoplastic may be slowly mixed so that the nanoparticles (or even nanomaterial clusters) deposited on the surface are continuously mixed into the molten polymer. This process will create a uniformly dispersed nanoparticle in the molten polymer. Therefore, one can achieve much higher weight fractions of the nanoparticle. Once the desired content is achieved, the molten polymer can be taken out of the deposition chamber and fed into the extruder or injection molder to manufacture a desired part or fed into a pelletizer/extruder to make pellets of this nanocomposite.

Depositing Nanoparticles on Liquid Surfaces of Thermosetting Polymers to Make Liquid Dispersion.

This process is carried out with thermosetting resins which are liquid at room temperature, such as many types of epoxy resins. The liquid resin is contained in a tank with an open surface and is placed inside the deposition chamber. The introduction of the nanomaterials into the deposition chamber is done as described above. The tank that contains the thermoset may be slowly mixed so that the nanoparticles deposited on the surface are continuously mixed into the liquid polymer. Again, this process will create a uniformly dispersed nanoparticle in the thermoset. Therefore, one can achieve much higher weight fractions of the nanoparticle. After the desired content is achieved the mixture can be sold as mixed; or can be used to make prepregs; or used directly in resin transfer molding process; or in filament winding process where low-viscosity liquid polymers are utilized.

Coating a Solid Surface with Nanoparticles.

The end product and goal of this process is different from the previous types of processes. Here, the nanoparticles, or even nanomaterial clusters are deposited on a curing or drying surface with has been coated with another layer of liquid material such as paint, adhesive or any type of polymer that is going through a cross-linking or a drying process during the nanoparticle coating. Introduction of nanoparticles into the coating chamber is done the same way. The placement of the substrate or surface to be coated and the duration of deposition can be adjusted to achieve desired coating thickness or desired nanoparticle density per unit surface. The timing in this process is more critical such that the nanoparticle will be embedded into the drying or curing surface material. After the drying or curing process is complete, the nanoparticle will be permanently set in place. This process, unlike the previous ones, yields a final product. The possible applications are: (i) coating medical implants with nanoparticles to increase the surface area and roughness of the implant surface, thus simulating better tissue and bone growth into the implant; (ii) achieving better hardness or wear properties at the surface; (iii) achieving the desired electrical or magnetic properties at the surface; or (iv) achieving desired wetting, moisture absorption, and permeability properties of the coated component.

Connection of the Nanoparticles with a Fluid Such as Ink, Paint, or a Polymer with the Intention to Deposit or Coat Another Surface.

In this process, instead of depositing/injecting only a solid nanoparticles into a chamber, a solid-liquid mixture is injected through a nozzle and atomized into the air. Again only the nanoparticle of the solid/liquid mixture will be deposited, and the larger ones will be separated.

All of the processes described herein can also be done intermittently or continuously by feeding the nanomaterials and by periodically opening and closing the injection port of the static mixer. Further, the nanomaterial clusters deposited at the bottom can be collected and recycled to reduce the wasted or unused material. This cycling process can be done continuously or intermittently during a deposition cycle.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, compositions of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

REFERENCES

1. Chen, L., Wong, S. C., and Pisharath, S., 2003, "Fracture Properties of Nanoclay-Filled Polypropylene," Journal of Applied Polymer Science, 88, pp. 3298-3305.
2. Abot, J. L., Yasmin, A., and Daniel, I. M., 2003, "Mechanical and Thermoviscoelastic Behavior of Clay/Epoxy Nanocomposites," Materials Research Society symposium proceedings, 740, pp. 16.5.1-16.5.6.
3. Lam, C. K., Cheung, H. Y., Lau, K. T., Zhou, L. M., Ho, M. W., and Hui, D., 2005, "Cluster Size Effect in Hardness of Nanoclay/Epoxy Composites," Composites Part B-Engineering, 36, pp. 263-269.
. Yasmin, A., Abot, J. L., and Daniel, I. M., 2003, "Processing of Clay/Epoxy Nanocomposites With a Three-Roll Mill Machine," Materials Research Society Symposium Proceedings, 740, pp. 13.7.1-13.7.6.
5. Lam, C. K., Lau, K. T., Cheung, H. Y., and Ling, H. Y., 2005, "Effect of Ultrasound Sonication in Nanoclay Clusters of Nanoclay/Epoxy Composites," Materials Letters, 59, pp. 1369-1372.
6. Aktas, L., Dharmavaram, S., Hamidi, Y. K., and Altan, M. C., in "Nanomaterials: New Research," pp. 197-218, Nova Science Publisher, Hauppauge, N.Y., 2005.

What is claimed is:

1. An apparatus for deposition of nanoparticles upon a deposition substrate, comprising:
    a container assembly comprising:
        a deposition chamber having an outer wall, an inner wall, an inner space, an upper end and a lower end, and the inner space having an upper inner portion and a lower inner portion positioned below the upper inner portion;
    a delivery assembly comprising:
        a nanomaterial feeding container for containing a nanomaterial, and
        a nanomaterial mixing and ejection device comprising a static mixer and a needle, the static mixer for mixing and breaking up aggregates in the nanomaterial delivered from the nanomaterial feeding container and ejecting the mixed nanomaterial through the needle into the inner space of the deposition chamber; and
    a deposition substrate container for supporting a deposition substrate within the upper inner portion of the deposition chamber and below the upper end of the deposition chamber, the deposition substrate having an exposed surface, and wherein the exposed surface of the deposition substrate is positioned in the upper inner portion of the deposition chamber above an orifice of the needle and below the upper end of the deposition chamber; and
    wherein the needle is oriented in a direction toward the lower inner portion of the deposition chamber such that when the nanomaterial is ejected from the ejection device through the orifice of the needle, the nanomaterial is ejected in a direction away from the deposition substrate container; and
    wherein when the nanomaterial is deposited within the nanomaterial feeding container, the nanomaterial can be fed into the nanomaterial mixing and ejection device wherein the nanomaterial can be mixed and wherein after mixing, the nanomaterial can be ejected into the inner space of the deposition chamber as particles comprising nanoparticles and nanomaterial clusters forming a suspension of nanoparticles in the upper inner portion of the deposition chamber wherein nanoparticles from the suspension of nanoparticles become deposited on the exposed surface of the deposition substrate below the upper end of the deposition chamber such that nanoparticles are the primary particles deposited on the exposed surface of the deposition substrate and nanomaterial clusters primarily settle in the lower inner portion of the deposition chamber.

2. The apparatus of claim 1 wherein the nanomaterial is separated substantially into smaller nanoparticles having maximum dimensions equal to or less than 1 µm and nanomaterial clusters having maximum dimensions greater than 1 µm.

3. The apparatus of claim 1 comprising a pair of container assemblies.

4. The apparatus of claim 1 wherein the deposition substrate container has a heating mechanism for heating the deposition substrate to a temperature for melting all or a portion of the deposition substrate.

5. The apparatus of claim 1 wherein deposition substrate can be continuously or intermittently added or removed from the deposition substrate container during ejection of nanomaterial into the deposition chamber.

6. The apparatus of claim 1 wherein the deposition substrate container is configured so as to support the deposition substrate in a position against the inner wall of the deposition chamber.

7. The apparatus of claim 1 further comprising means for introducing the nanomaterial into the deposition chamber through the needle via air, nitrogen, oxygen, carbon dioxide, carbon monoxide, argon, neon, helium, nitrogen, methane, ethylene, or mixtures thereof.

* * * * *